(12) United States Patent
Block et al.

(10) Patent No.: US 9,600,120 B2
(45) Date of Patent: Mar. 21, 2017

(54) DEVICE, METHOD, AND GRAPHICAL USER INTERFACE FOR ORIENTATION-BASED PARALLAX DISPLAY

(71) Applicant: Apple Inc., Cupertino, CA (US)

(72) Inventors: Eliza Carey Block, San Francisco, CA (US); Alessandro F. Sabatelli, San Francisco, CA (US)

(73) Assignee: APPLE INC., Cupertino, CA (US)

(\*) Notice: Subject to any disclaimer, the term of this patent is extended or adjusted under 35 U.S.C. 154(b) by 76 days.

(21) Appl. No.: 14/214,050

(22) Filed: Mar. 14, 2014

(65) Prior Publication Data
US 2014/0306938 A1 Oct. 16, 2014

Related U.S. Application Data

(60) Provisional application No. 61/793,723, filed on Mar. 15, 2013.

(51) Int. Cl.
*G06F 3/041* (2006.01)
*G06F 1/16* (2006.01)
(Continued)

(52) U.S. Cl.
CPC .......... *G06F 3/0418* (2013.01); *G06F 1/1694* (2013.01); *G06F 3/017* (2013.01); *G06F 3/04815* (2013.01); *G06F 3/04886* (2013.01)

(58) Field of Classification Search
None
See application file for complete search history.

(56) References Cited

U.S. PATENT DOCUMENTS

2007/0085845 A1\* 4/2007 Kikuchi ................ G06F 3/0412
345/204
2008/0122737 A1 5/2008 Lea et al.
(Continued)

FOREIGN PATENT DOCUMENTS

EP 2 090 974 A1 8/2009

OTHER PUBLICATIONS

International Search Report and Written Opinion, dated Jun. 12, 2014, received in International Patent Application No. PCT/2014/026497, which corresponds with U.S. Appl. No. 14/214,050, 9 pages.
(Continued)

*Primary Examiner* — Joseph Haley
*Assistant Examiner* — Ifedayo Iluyomade
(74) *Attorney, Agent, or Firm* — Morgan, Lewis & Bockius LLP

(57) ABSTRACT

A method includes displaying three or more display layers, the three or more display layers including at least a first display layer and a second display layer. The method further includes shifting display positions of at least the first display layer and the second display layer. Shifting the display positions includes applying a first (x,y) offset to the display position of the first display layer, and applying a second (x,y) offset to the display position of the second display layer, wherein the first (x,y) offset and the second (x,y) offset are determined in accordance with a calculated difference between a detected orientation of the electronic device and a reference orientation. The method further includes redisplaying the three or more display layers after the shifting of the display positions. At least one of the first display layer and the second display layer is responsive to touch input gestures.

24 Claims, 17 Drawing Sheets

(51) Int. Cl.
G06F 3/0481 (2013.01)
G06F 3/0488 (2013.01)
G06F 3/01 (2006.01)

(56) References Cited

U.S. PATENT DOCUMENTS

| | | |
|---|---|---|
| 2008/0174570 A1* | 7/2008 | Jobs et al. .................... 345/173 |
| 2011/0202834 A1 | 8/2011 | Mandryk et al. |
| 2011/0254835 A1 | 10/2011 | Segal |
| 2012/0188154 A1* | 7/2012 | Lee ....................... G06F 1/1694 345/156 |
| 2012/0229447 A1 | 9/2012 | Ronkainen |
| 2013/0091462 A1* | 4/2013 | Gray .................... G06F 3/0346 715/810 |
| 2013/0293470 A1* | 11/2013 | Kwon .......................... 345/158 |

OTHER PUBLICATIONS

International Preliminary Report on Patentability, dated Sep. 15, 2015, received in International Patent Application No. PCT/2014/026497, which corresponds with U.S. Appl. No. 14/214,050, 6 pages.

42labs, "Making Android Wallpaper with Parallax Scrolling Support Using AndEngine," 42labs.net—mobile devloper's blog, http://42labs.tumblr.com/post/23606305901/making-android-wallpaper-with-parallax-scrolling, May 23, 2012, 4 pages.

Grouchnikov, "Live Wallpapers with Android SDK 2.1," http://www.pushing-pixels.org/2010/02/01/live-wallpapers-with-android-sdk-2-1.html, Feb. 1, 2010, 9 pages.

* cited by examiner

DEVICE, METHOD, AND GRAPHICAL USER INTERFACE FOR ORIENTATION-BASED PARALLAX DISPLAY

CROSS REFERENCE TO RELATED APPLICATIONS

The present application claims priority to U.S. Provisional Application Ser. No. 61/793,723 filed Mar. 15, 2013, which is incorporated by referenced herein in its entirety.

TECHNICAL FIELD

This relates generally to electronic devices with touch-sensitive surfaces, including but not limited to electronic devices with touch-sensitive surfaces that provide orientation-based parallax displays.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. However, user interfaces can become cluttered, making it difficult to visually differentiate icons, images, control elements, and the like, and making it more difficult to understand programmatic interrelationships (or lack thereof) between different user interface objects. This can make manipulating user interfaces cumbersome and inefficient. For example, when several user interface objects are displayed on the same display, it may be difficult for the user to perceive whether it is selectable or not (e.g., whether it will respond to an input). Such problems cause inefficiencies in device operation, thereby wasting energy. This consideration is particularly important in battery operated devices.

SUMMARY

Accordingly, there is a need for electronic devices with faster, more efficient methods and interfaces for displaying information and/or user interface objects to a user. Such methods and interfaces optionally complement or replace conventional user interface methods. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display and an orientation sensor. The method includes displaying three or more display layers, the three or more display layers including at least a first display layer and a second display layer. The method further includes shifting display positions of at least the first display layer and the second display layer by applying a first (x,y) offset to the display position of the first display layer; and applying a second (x,y) offset to the display position of the second display layer, wherein the first (x,y) offset and the second (x,y) offset are determined in accordance with a calculated difference between a detected orientation of the electronic device and a reference orientation. The method further includes redisplaying the three or more display layers after the shifting of the display positions, wherein at least one of the first display layer and the second display layer is responsive to touch input gestures.

In accordance with some embodiments, a method is performed at an electronic device with a display and an orientation sensor. The method includes receiving instructions assigning at least one respective application view to each of three or more display layers, including instructions assigning a first application view to a first layer, a second application view to a second layer, and a third application view to a third layer. The method further includes displaying the three or more display layers. The method further includes shifting display positions of at least the first display layer and the second display layer by applying a first (x,y) offset to the display position of the first display layer; and applying a second (x,y) offset to the display position of the second display layer, wherein the first (x,y) offset and the second (x,y) offset are determined in accordance with a calculated difference between a detected orientation of the electronic device and a reference orientation. The method further includes redisplaying the three or more display layers after the shifting of the display positions, wherein at least one of the first application view and the second application view is responsive to touch input gestures.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described above. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred described above. In accordance with some embodiments, an electronic device includes: a display, a touch-sensitive surface, and optionally one or more sensors to detect intensity of contacts with the touch-sensitive surface; and means for performing the operations of any of the methods described above. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods described above.

Thus, electronic devices with displays are provided with faster, more efficient methods and interfaces for displaying user interface objects, thereby increasing the effectiveness, efficiency, and user satisfaction with such devices. Such methods and interfaces may complement or replace conventional methods for displaying user interface objects.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
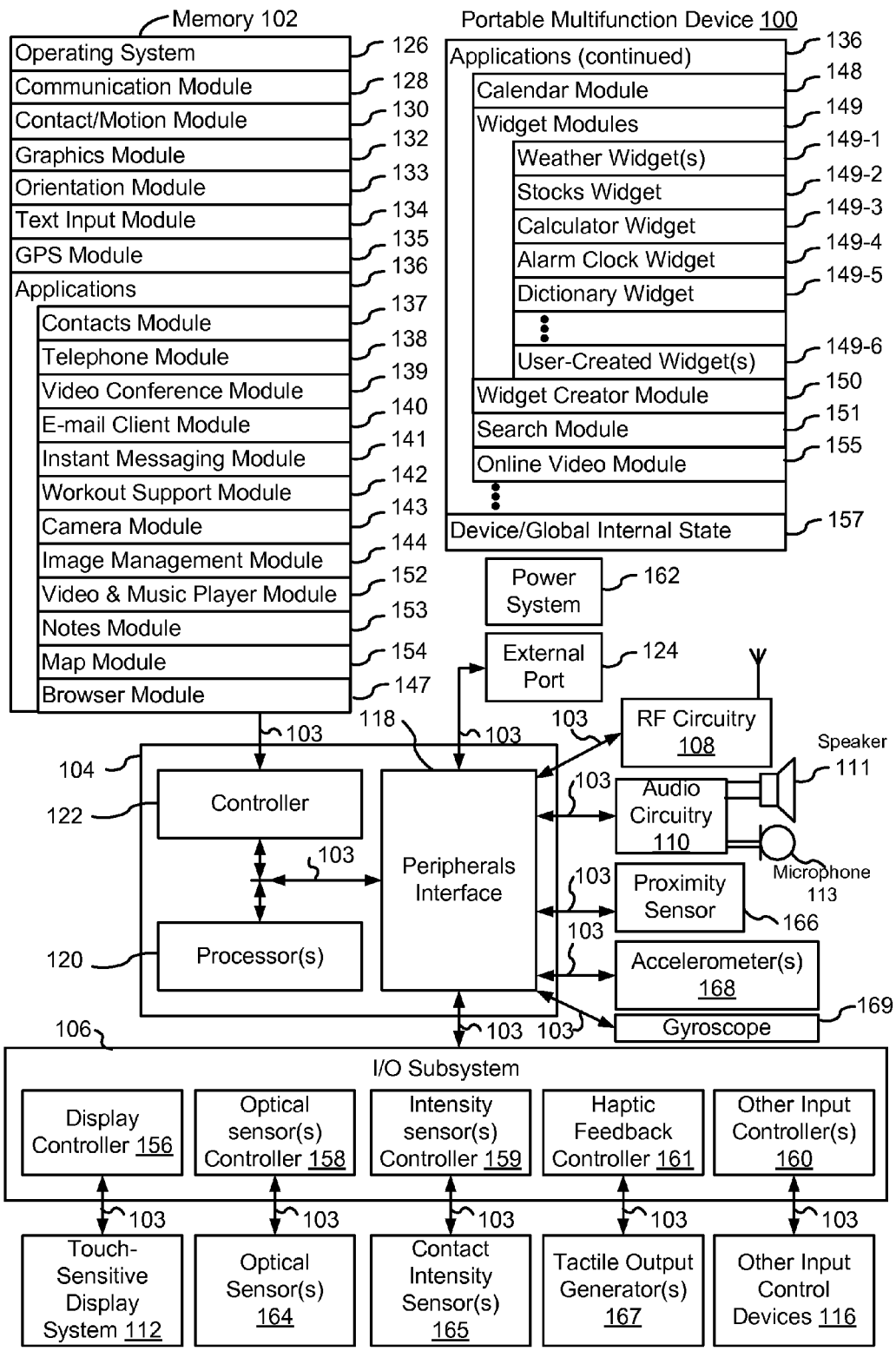
FIG. 1A is a block diagram illustrating a portable multifunction device with a touch-sensitive display in accordance with some embodiments.

Many electronic devices have graphical user interfaces with many different objects, such as background wallpaper, selectable icons, status information, etc. These objects are often arranged on a flat, 2-dimensional screen. An appearance of 3-dimensionality can be provided to the user, for example, by using shadows, opaque icons that cover background images, and semi-transparent graphical elements, etc. to suggest that some objects are in front of others (e.g., that the objects are layered). An appearance of 3-dimensionality can also be provided to the user by changing the display positions of user interface objects based on the orientation and/or attitude of the device. For example, a first layer, such as a wallpaper layer, can be shifted relative to other user interface objects (and/or relative to the device itself) when the device is moved, creating the illusion that the first layer is positioned a certain distance behind the surface of the device. The display positions of other layers (e.g., layers containing icons or application content, status information, etc.) can also be shifted relative to other layers and/or the device itself.

By changing the display positions of layers based on the device orientation, the user interface appears as if there are several layers of objects situated behind the screen of the device, separated from one another by a non-zero distance. By providing the illusion of depth, user interface elements are differentiated from one another in an interesting and informative way. For example, in some embodiments, user interface objects of the same or similar class or function can appear on the same layer. Further, in some embodiments, user interface objects that do not respond to user inputs (e.g., wallpaper, a clock display, etc.) are on certain layers, and user interface objects that do respond to user inputs (e.g., application icons, control affordances, etc.) are on other layers. In some embodiments, the display positions are shifted in response to movements of the device that are typical of normal use of the device, such that the illusion of depth (and, specifically, of multiple separate layers stacked upon one another) is generated during normal use of the device. Accordingly, a user is able to easily and quickly discern useful information about the user interface and the user interface objects based on the layer on which the objects reside.

Below, FIGS. 1A-1B, 2, and 3 provide a description of exemplary devices. FIGS. 4A-4B, 5A-5H, and 5I-5K illustrate exemplary user interfaces based on various device orientations.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from a haptic feedback module (not shown) and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown), a gyroscope and/or gyroscopic sensor 169, and a GPS (or GLONASS or other global navigation system) receiver (not shown) for obtaining information concerning the location and orientation (e.g., portrait or landscape) of device 100.

In some embodiments, the gyroscope 169 detects 3-axis angular acceleration (and/or position) about x, y, and z axes of the device 100, enabling calculation of the device's pitch, roll, and yaw with respect to a principal reference orientation (e.g., by the orientation module 133). In some embodiments, the principal reference orientation is set in response to certain events detectable by the device 100, such as when the device 100 is powered on. FIG. 4C illustrates a perspective view of a device (e.g., the device 100), in accordance with some embodiments. In some embodiments, the pitch angle of the device 100 corresponds to an amount of rotation of the device about an x-axis 480 (pitch axis) with respect to the principal reference orientation. As shown in FIG. 4C, the x-axis 480 is parallel to the top and bottom sides of the device 100. In some embodiments, the roll angle of the device 100 corresponds to an amount of rotation of the device about a y-axis 482 (roll axis). As shown in FIG. 4C, the y-axis 482 is parallel to left and right sides of the device 100. In some embodiments, the yaw angle of the device 100 corresponds to an amount of rotation of the device about a z-axis 484 (yaw axis). As shown in FIG. 4C, the z-axis 484 is perpendicular to the touch screen 112 and/or the plane defined by the x- and y-axes.

The x and y axes of the device 100 in FIG. 4C are described above in relation to the device 100 in a portrait orientation (e.g., as detected by the accelerometer(s) 168 and/or the gyroscope 169). However, in some embodiments, the x and y axes are transposed when the device 100 is in a landscape orientation (e.g., when the graphical user interface is displayed in a landscape view). Thus, from the viewpoint of a user, the x-axis may correspond to a horizontal direction of the graphical user interface displayed on the touch screen 112 and the y-axis may correspond to a vertical direction of the graphical user interface displayed on the touch screen 112, regardless of whether the graphical user interface is displayed in a portrait view or a landscape view.

Figure 3:
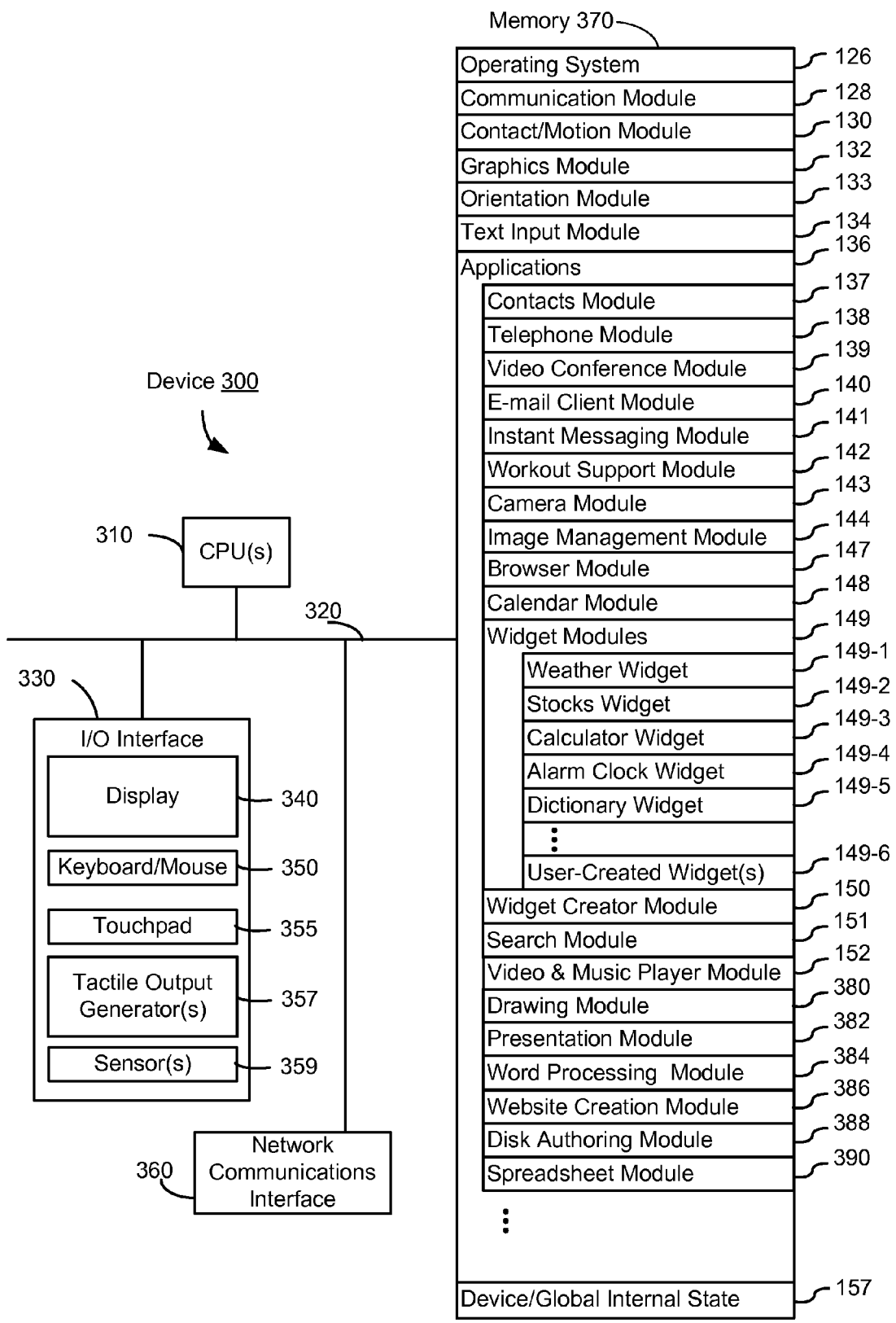
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Orientation module 133 includes software components for detecting and/or calculating the orientation of the device. Orientation module 133 receives data from the gyroscope 169 and/or the accelerometer(s) 168 in order to detect and/or calculate the device's orientation. In some embodiments, the orientation module 133 detects and/or calculates a pitch angle metric, a roll angle metric, and a yaw angle metric with respect to a principal reference orientation for the device's current orientation. In some embodiments, the metrics are degrees, radians, or any other representative value.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
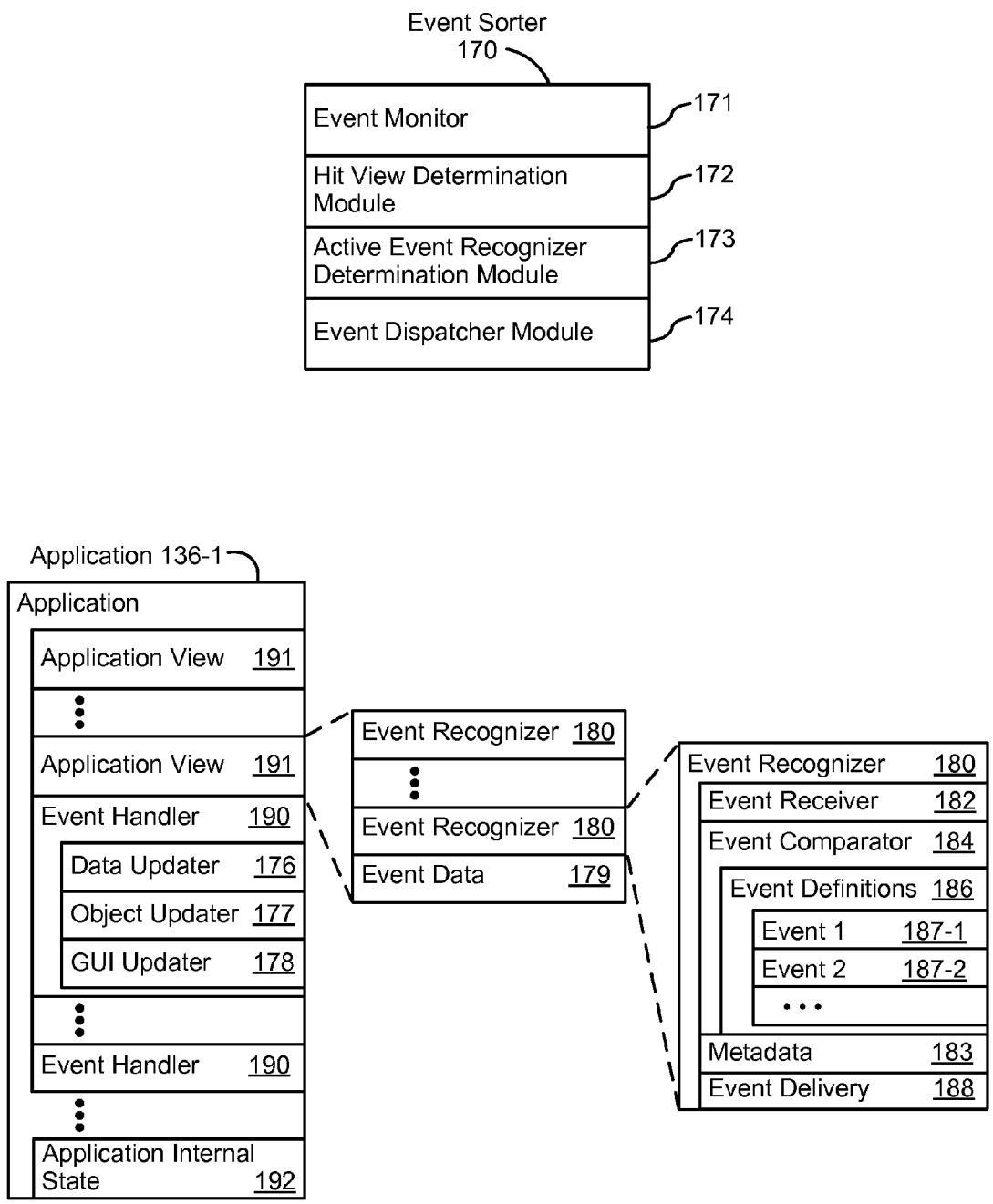
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
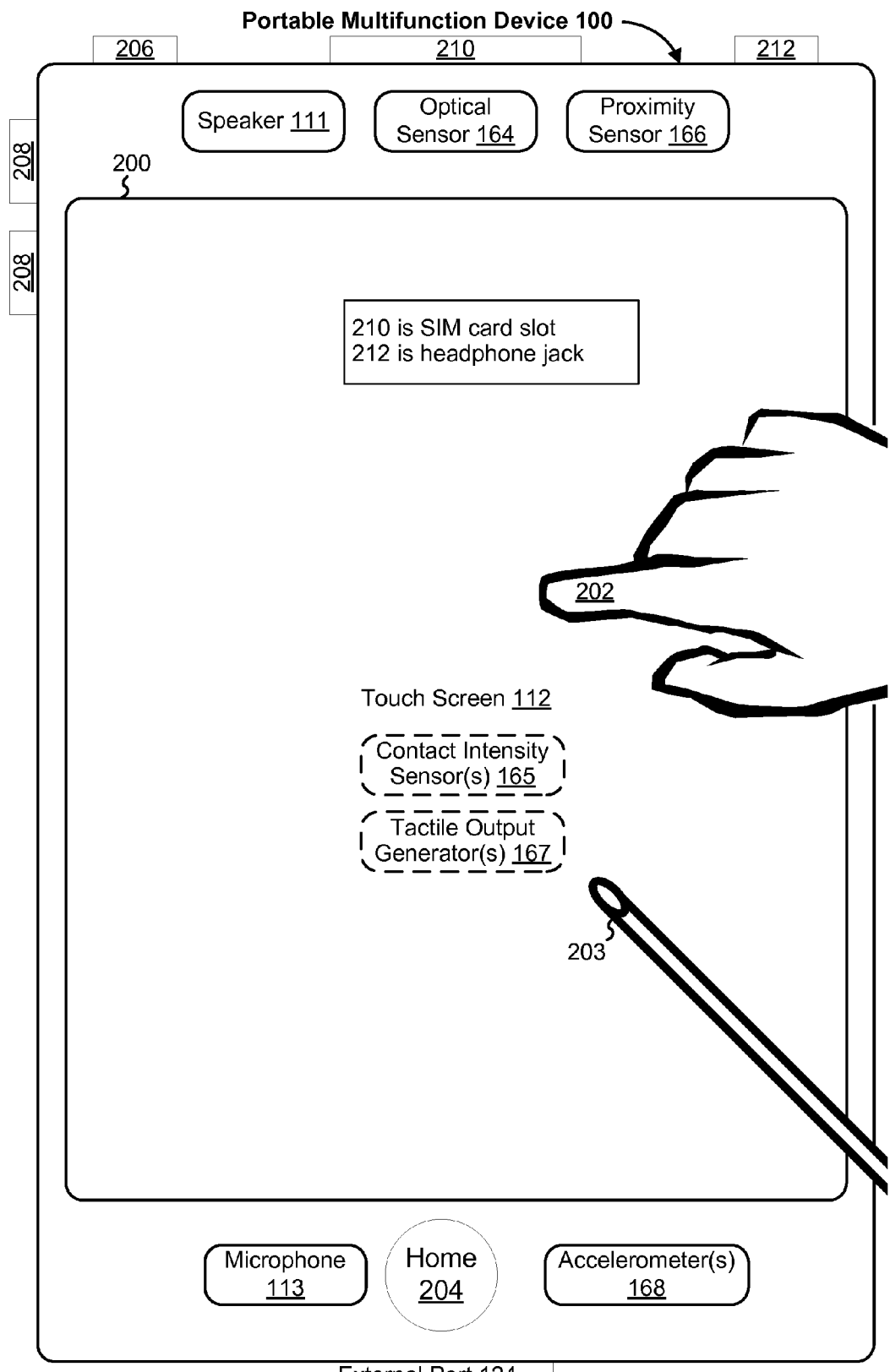
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
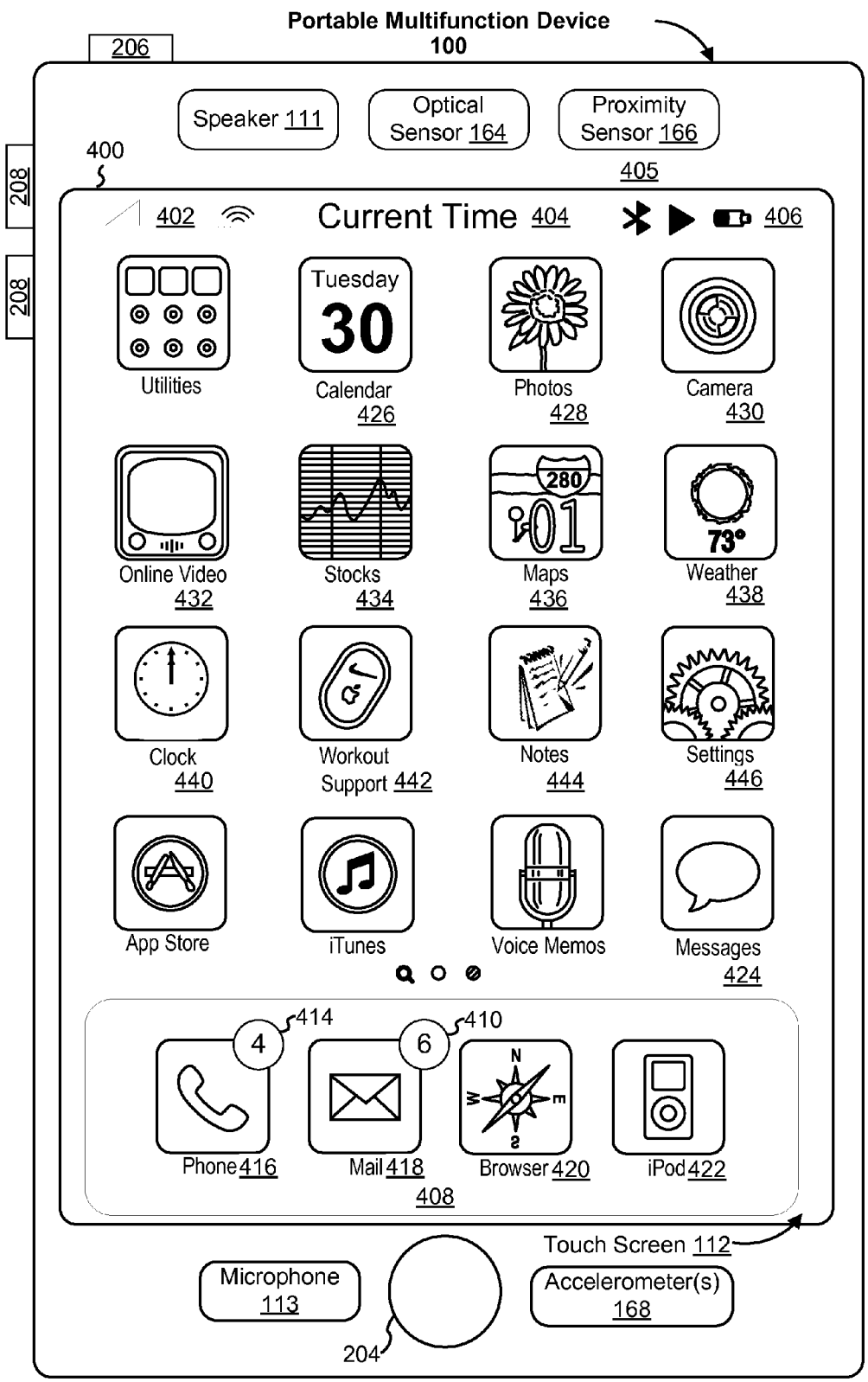
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
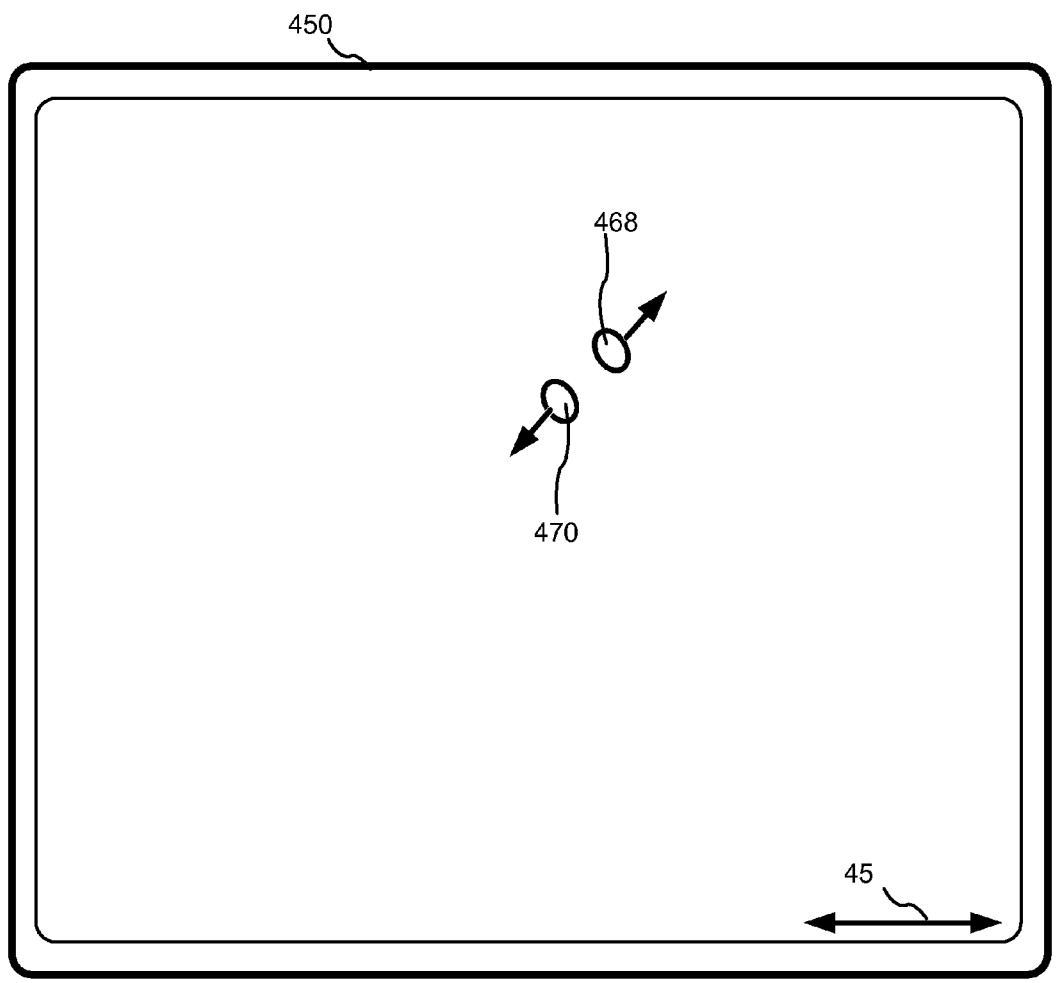
FIG. 4B illustrates an exemplary user interface for a multifunction device with a touch-sensitive surface that is separate from the display in accordance with some embodiments.
Figure 4B:
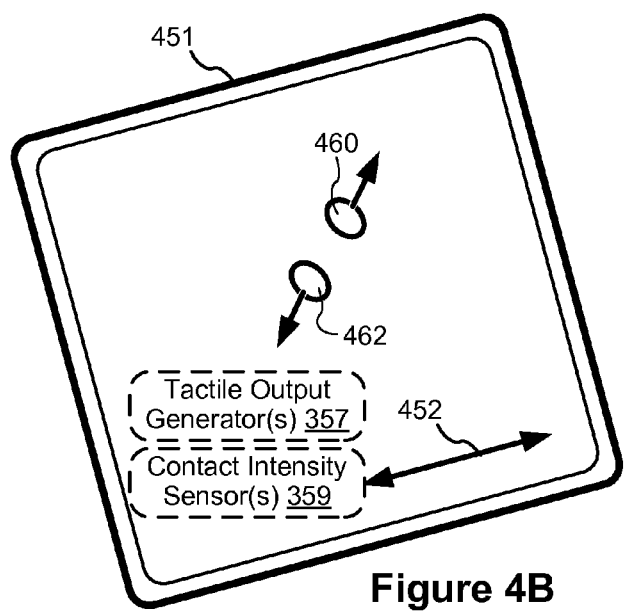
Figure 4C:
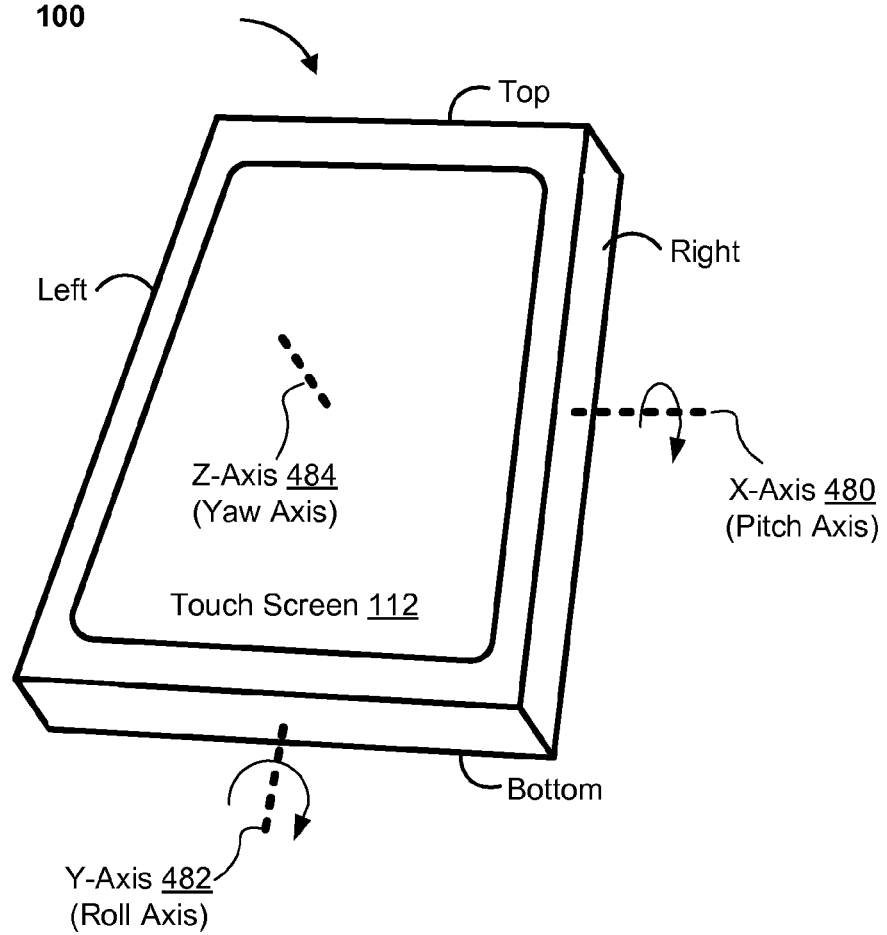
FIG. 4C illustrates an exemplary multifunction device with a touch-sensitive surface in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on a multifunction device with a display and a touch-sensitive surface, such as device 300 or portable multifunction device 100.

FIGS. 5A-5H and 5I-5K illustrate an exemplary device (e.g., the multifunction device 100) and exemplary user interfaces that include and/or present an orientation-based and/or motion-based parallax display. In some embodiments, the user interfaces include multiple display layers that shift on one or more directions relative to one another and/or relative to the device 100. By shifting the display layers in accordance with the disclosed embodiments, interesting visual effects may be produced. For example, by shifting background and foreground layers relative to one another in response to a pitch and/or roll motion of the device, an illusion of depth may be provided, such that the foreground layer looks as if it is physically spaced apart from the background layer by a non-zero distance in the z-direction.

Accordingly, in some embodiments, a method is performed at an electronic device (e.g., the device 100) with a display (e.g., the touch screen 112) and an orientation sensor (e.g., the gyroscope 169). The device 100 displays three or more display layers on the display (e.g., the touch screen 112), the three or more display layers including at least a first display layer and a second display layer. In some embodiments, the first display layer corresponds to a wallpaper layer. In some embodiments, the wallpaper layer, includes, for example, an image, photograph, design, or the like. In some embodiments, the second display layer corresponds to an application layer. In some embodiments, the application layer includes icons and/or application content (e.g., application icons such as those described above with respect to FIG. 4A). At least one of the first display layer and the second display layer is responsive to touch input gestures. For example, in some embodiments, an application layer is responsive to touch input gestures (e.g., tap gestures to select icons, swipe gestures to scroll icons, etc.).

In some embodiments, other layers of the three or more display layers include a dock layer (e.g., 408 in FIGS. 5C, 5E, 5G, 5I, and 5K), and a status information layer (e.g., including notification icons such as signal strength indicator(s) (e.g., 402 in FIGS. 5C, 5E, 5G, 5I, and 5K) for wireless communication(s), such as cellular and Wi-Fi signals; time indicator (e.g., 404 in FIGS. 5C, 5E, 5G, 5I, and 5K); Bluetooth indicator (e.g., 405 in FIGS. 5C, 5E, 5G, 5I, and 5K); battery status indicator (e.g., 406 in FIGS. 5C, 5E, 5G, 5I, and 5K)). In some embodiments, the layers are arranged in the following virtual three-dimensional ordering (from back to front): the wallpaper layer, the application layer, the dock layer, and the status information layer.

The device 100 shifts display positions of at least the first display layer and the second display layer (e.g., with the graphics module 132). Shifting the display positions of the display layers includes applying a first (x,y) offset to the display position of the first display layer, and applying the second (x,y) offset to the display position of the second display layer. The first (x,y) offset and the second (x,y) offset are determined in accordance with a calculated difference between a detected orientation of the electronic device and a reference orientation. In some embodiments, the reference orientation corresponds the orientation of the device when the device is predicted to be perpendicular to a viewer's line of sight or view angle path to the display of the device. In some embodiments, the reference orientation corresponds to an orientation of the device after detection of one or more events, as described in greater detail below. The reference orientation may or may not correspond to the principal reference orientation. In some embodiments, the reference orientation is determined, redetermined, and/or adjusted at different times and/or in response to different conditions and/or events than the principal reference orientation.

Figure 5A:
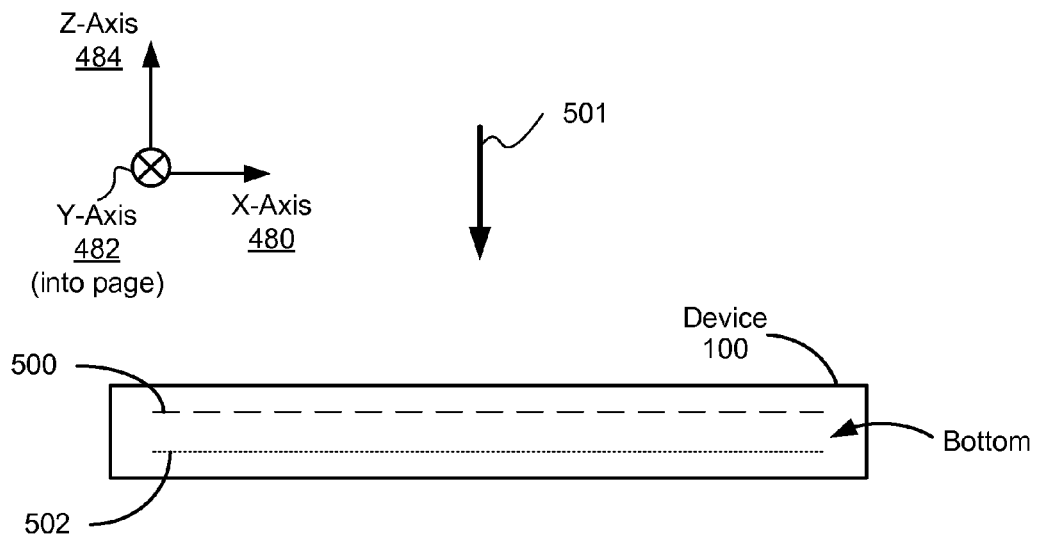
FIGS. 5A-5B, 5D, 5F, 5H, and 5J illustrate an exemplary multifunction device in various orientations in accordance with some embodiments.

The device 100 redisplays the three or more display layers after the shifting of the display positions (e.g., with the graphics module 132). In some embodiments, the shifting and redisplaying of the three or more display layers provides and/or enhances an illusion of 3-dimensional depth on the display. FIG. 5C illustrates an exemplary user interface prior to the shifting of the display positions, and FIG. 5E illustrates the exemplary user interface in which a first x offset has been applied to the display position of the first display layer (e.g., the wallpaper 504) and a second x offset has been applied to the display position of the second display layer (e.g., the application icons described above with respect to FIG. 4A). The first x offset and the second x offset are represented by arrow 552 and arrow 550, respectively.

Some techniques for determining (x,y) offsets are described. In some embodiments, a first maximum x offset and a first maximum y offset are assigned to the first display layer, and a second maximum x offset and a second maximum y offset are assigned to the second display layer. In some embodiments, maximum x and y offsets are specified by a number of pixels (e.g., a maximum x offset of 30 pixels, and a maximum y offset of 15 pixels).

In some embodiments, the maximum x offset for a layer specifies the maximum distance that the layer can shift in either direction along the x-axis 480 (FIG. 4C) in response to a change in device orientation, and the maximum y offset for a layer specifies the maximum distance that the layer can shift in either direction along the y-axis 482 (FIG. 4C) in response to a change in device orientation. For example, a maximum x offset of 30 pixels indicates that the layer can shift by 30 pixels in the positive x direction and 30 pixels in the negative x direction. In some implementations, maximum offsets for a particular layer include separate maximum positive and maximum minimum values. For example, the maximum x offset for a layer may include a maximum positive x offset of a first value and a maximum negative x offset of a second value different from the first value. Thus, in some embodiments, the maximum positive x offset can have a different value than the maximum negative x offset, and the maximum positive y offset can have a different value than the maximum negative y offset.

In accordance with the calculated difference (between the detected orientation of the electronic device and the reference orientation), which includes a roll angle metric and pitch angle metric, the device 100 determines (e.g., with the graphics module 123) the first x offset in accordance with the first maximum x offset and the roll angle metric, the first y offset in accordance with the first maximum y offset and the pitch angle metric, the second x offset in accordance with the second maximum x offset and the roll angle metric, and the second y offset in accordance with the second maximum y offset and the pitch angle metric.

Referring back to FIG. 4C, in some embodiments, the roll angle metric and the pitch angle metric represent an amount that the attitude of the device 100 has changed about the roll axis and the pitch axis, respectively, with respect to a reference orientation. In some embodiments, the roll angle metric is a normalized value between −1 and 1 representing a roll angle in the range from −90 degrees to 90 degrees about the roll axis, and the pitch angle metric is a normalized value between −1 and 1 representing a pitch angle in the range from −90 to 90 degrees about the pitch axis. In some embodiments, angle metrics are constrained such that rotation of the device beyond a certain angle is not reflected in the angle metric. For example, in some embodiments, the angle metrics are constrained at +/−90 degrees. Thus, if the device rotates +100 degrees about the roll axis, the roll angle metric will be constrained at 1.

In some embodiments, (x,y) offsets are determined by multiplying the maximum offset for a particular axis by the angle metric for that axis. For example, in some embodiments, the first x offset (e.g., of the first layer) is determined by multiplying the first maximum x offset by the roll angle metric. As an illustrative calculation, in some embodiments, if first maximum x offset is 30 pixels, and the device 100 detects a roll angle metric of 0.5 (corresponding to a 45 degree difference in roll angle from a reference orientation), the first x offset is 15 pixels.

In some embodiments, there is a non-linear relationship between the range of the angle metric for a respective axis and the display offset corresponding to that range. For example, in some embodiments, changes in an angle metric correspond to a display offset value determined in accordance with a sigmoid function (or any other appropriate non-linear function or mapping of angle metrics to display offset values).

In some embodiments, the device 100 detects direction locked movement of the device 100 (e.g., with the gyroscope 169 in conjunction with the orientation module 133), by detecting when movement of the electronic device meets predefined direction lock criteria. In some embodiments, predefined direction lock criteria corresponds to changes in pitch angle with less than a threshold level of change in roll angle. In accordance with detection of direction locked movement of the device, the device 100 maintains current values of the first x offset and the second x offset during the direction locked movement of the device. For example, when the device detects a change in orientation of the device that includes a pitch angle change with only a certain amount of roll angle change (e.g., less than a threshold amount), the device determines that the device is in a direction locked movement, and maintains the current values of the first and second x offsets (e.g., corresponding to the horizontal shifting of the first and second layers) such that the first and second layers will not shift horizontally during the direction locked movement. In some embodiments, the threshold level of change in roll angle corresponds to an amount of change of roll angle (e.g., within +/−10 degrees) and/or a rate of change of roll angle.

In some embodiments, in accordance with detection of direction locked movement of the device, during the direction locked movement of the device, the device 100 determines (e.g., with the graphics module 132) a value of the first y offset in accordance with a third maximum y offset distinct from the first maximum y offset, and determines a value of the second y offset in accordance with a fourth maximum y offset distinct from the second maximum y offset. In some embodiments, the third maximum y offset is determined by applying a scaling value (e.g., a value between 0.1 and 10, but not equal to 1) to the first maximum y offset, and the fourth maximum y offset is determined by applying a scaling value (e.g., a value between 0.1 and 10, but not equal to 1) to the second maximum y offset. Thus, in some embodiments, when the device 100 detects direction locked movement, the maximum y offsets of one or more of the display layers are increased or decreased such that those display layers are shifted more or less than they would be if direction locked movement were not detected.

In the examples above, direction locked movement is detected when the device 100 detects changes in pitch angle with less than a threshold level of change in roll angle. However, the same discussion applies by analogy to direction locked movement of the device corresponding to changes in roll angle with less than a threshold level of change in pitch angle.

In some embodiments, the device 100 shifts display position of a first object relative to the first display layer, including applying a third (x,y) offset to the display position of the first object, relative to the display position of the first display layer, wherein the third (x,y) offset is determined in accordance with the calculated difference between the detected orientation of the electronic device and the reference orientation. For example, if the first maximum y offset (corresponding to the first layer) is 20 pixels, and the third maximum y offset (corresponding to the first object) is 10 pixels, then the display position of the first object can be shifted a maximum of 10 pixels along the y axis relative to the display position of the first display layer.

In some embodiments, the device 100 shifts display position of an object component relative to the first object (e.g., with the graphics module 132), including applying a fourth (x,y) offset to the display position of the object component, relative to the display position of the first object, wherein the fourth (x,y) offset is determined in accordance with the calculated difference between the detected orientation of the electronic device and the reference orientation. For example, continuing the example above, if the third maximum y offset (corresponding to the first object) is 10 pixels, and the fourth maximum y offset (corresponding to the object component) is 5 pixels, then the object component can be shifted a maximum of 5 pixels along the y axis relative to the display position of the first object.

In some embodiments, the first layer contains one or more icon borders or boundaries (e.g., icon border 510 in FIG. 5C), the first object is an icon image or icon images (e.g., icon image 512 in FIG. 5C), and the first object component is an icon badge (e.g., icon badge 514 in FIG. 5C). Accordingly, the display positions of these components may be shifted relative to one another (and/or relative to other layers, graphical elements, etc.).

In some embodiments, the device 100 applies a transformation to the first layer (e.g., with the graphics module 132)

that simulates tilting or 3 dimensional rotation of the first layer. In some embodiments, the redisplaying of the three or more layers comprises redisplaying the three or more display layers after the shifting of the display positions and the application of the transformation to the first layer. In some embodiments, the transformation includes applying one or more perspective transformations to a wallpaper of the first layer. In some embodiments, the one or more perspective transformations comprise an anamorphic perspective transformation. In some embodiments, the perspective transformation results in an expansion and/or compression of at least a portion of a graphic on the wallpaper. In some embodiments, an expansion of a portion of the wallpaper causes the graphics on that portion of the wallpaper to appear larger, resulting in or enhancing the illusion that that portion of the wallpaper has moved closer to the user. Conversely, a compression of a portion of the wallpaper causes the graphics on that portion of the wallpaper to appear smaller, and results in or enhances the illusion that that portion of the wallpaper has moved away from the user.

In some embodiments, the device 100 determines perspective transformations that are to be applied to a layer in accordance with the calculated difference between the detected orientation of the electronic device and the reference orientation (e.g., by the graphics module 132). In some embodiments, a change in pitch angle corresponds to a perspective transformation along the y-axis of the device, such that a portion of the wallpaper corresponding to the side of the device 100 that is pitched away from a viewer appears compressed relative to another portion of the wallpaper. In some embodiments, a change in roll angle corresponds to a perspective transformation along the x-axis of the device, such that a portion of the wallpaper corresponding to the side of the device 100 that is rolled away from a viewer appears compressed relative to another portion of the wallpaper. (The appearance of compression may be created by compressing a portion of the wallpaper, expanding a portion of the wallpaper, or compressing and expanding different portions of the wallpaper.) In some embodiments, perspective transformations along x and y axes are combined, such that compound 3 dimensional tilts and/or rotations are simulated.

As noted above, the device 100 calculates a difference between a detected orientation of the device and a reference orientation (e.g., with the orientation module 133 in conjunction with the gyroscope 169). In some embodiments, the device 100 establishes the reference orientation of the device 100 before the shifting of the display positions (e.g., with the contact/motion module 130 in conjunction with the gyroscope 169). In some embodiments, in accordance with detection of any of a set of predefined events, the device 100 redetermines the reference orientation, and subsequently redetermines the first (x,y) offset and the second (x,y) offset in accordance with a calculated difference between a detected orientation of the electronic device and the redetermined reference orientation. In some embodiments, the time at which the first and second (x,y) offsets are redetermined is later than the time at which the first and second offsets were initially determined.

In some embodiments, the set of predefined events include two or more of the set consisting of: a movement of the device that exceeds a predefined speed criterion, a change in displayed content that meets predefined criteria, a change from displaying content to or from a landscape orientation from or to a portrait orientation. For example, the reference orientation may be redetermined when the touch screen 112 transitions from an off state to an on state, when an application is launched, etc.

In some embodiments, when the detected orientation is different from the reference orientation, the reference orientation is continuously adjusted so as to converge the reference orientation with the detected orientation. For example, if a device is rolled 10 degrees, to the right, the device will detect a 10 degree difference in roll angle between the reference orientation and the detected orientation. In response to detecting this difference, in some embodiments, the device continuously shifts the reference orientation until the difference between the reference orientation and the detected orientation is zero. In some embodiments, shifting the reference orientation is performed slowly relative to the typical motion of the device, such that it is difficult to detect by a user under normal use conditions and observations. Continuously converging the reference orientation with the detected orientation can help prevent the layers from becoming stuck in an offset position, and can help prevent a gimbal lock condition from persisting, which could detract from the quality of the user experience.

In some embodiments, objects, such as icons, images, etc., include or define areas that are transparent or partially transparent, such that the layer behind the object is visible through the transparent or partially transparent areas. In some embodiments, the shifting of the layers as described above is apparent through the transparent or partially transparent areas. Thus, if an icon that overlays a background wallpaper includes a transparent or partially transparent area, relative shifting of the icon layer and the background layer will cause the portion of the wallpaper that is visible through the transparent or partially transparent area to change. This helps enhance the 3-dimensional effect caused by the shifting (and/or the transforming) of the layers. In some embodiments, the area of a background layer that is visible through a transparent or partially transparent area is blurred (e.g., with a blurring effect and/or overlay).

According to some embodiments, a method is provided whereby application views of applications for execution by the device 100 are assigned to display layers, in accordance with the techniques and methods described herein. The method is performed at an electronic device (e.g., the device 100) with a display (e.g., the touch screen 112) and an orientation sensor (e.g., the gyroscope 169). The device 100 receives instructions assigning at least one respective application view to each of three or more display layers, including instructions assigning a first application view to a first layer, a second application view to a second layer, and a third application view to a third layer. In some embodiments, the received instructions assigning at least one respective application view to each of three or more display layers further assign a first maximum x offset and a first maximum y offset to the first display layer and a second maximum x offset and a second maximum y offset to the second display layer. As noted above, application views are aspects of applications in which information is displayed and touch-based gestures occur. For example, an application view may correspond to a programmatic level within a programmatic view or view hierarchy of an application. At least one of the first application view and the second application view (assigned to the first layer and the second layer, respectively) is responsive to touch input gestures.

The device 100 displays the three or more display layers. The device 100 shifts display positions of at least the first display layer and the second display layer, including applying a first (x,y) offset to the display position of the first display layer, and applying a second (x,y) offset to the display position of the second display layer. The first (x,y) offset and the second (x,y) offset are determined in accordance with a calculated difference between a detected orientation of the electronic device and a reference orientation. The device 100 redisplays the three or more display layers after the shifting of the display positions.

Several specific implementations and/or instances of the above techniques are now described with reference to FIGS. 5A-5H and 5I-5K. FIG. 5A is a view of the device 100 from the bottom (as depicted in FIG. 4C), according to some embodiments. The device 100 includes a first layer 500 and a second layer 502. For illustrative purposes, the first layer 500 and the second layer 502 in FIGS. 5A-5H and 5I-5K are shown separated by a non-zero distance along the z-axis. However, in some embodiments, the layers are displayed on a single display component, and are not actually separated by any physical distance. The separation between the layers in the figures is provided in order to illustrate how the display position of the layers can be shifted relative to one another (and/or relative to the device itself). In some embodiments, the shifting of the display positions as shown mimics or represents how the user interface would look if it were in fact composed of multiple layers separated from one another by a non-zero distance. Arrow 501 (shown in FIGS. 5A-B, 5D, 5F, 5H, and 5J) represents a view direction of a user of the device 100, according to some embodiments.

Figure 5B:
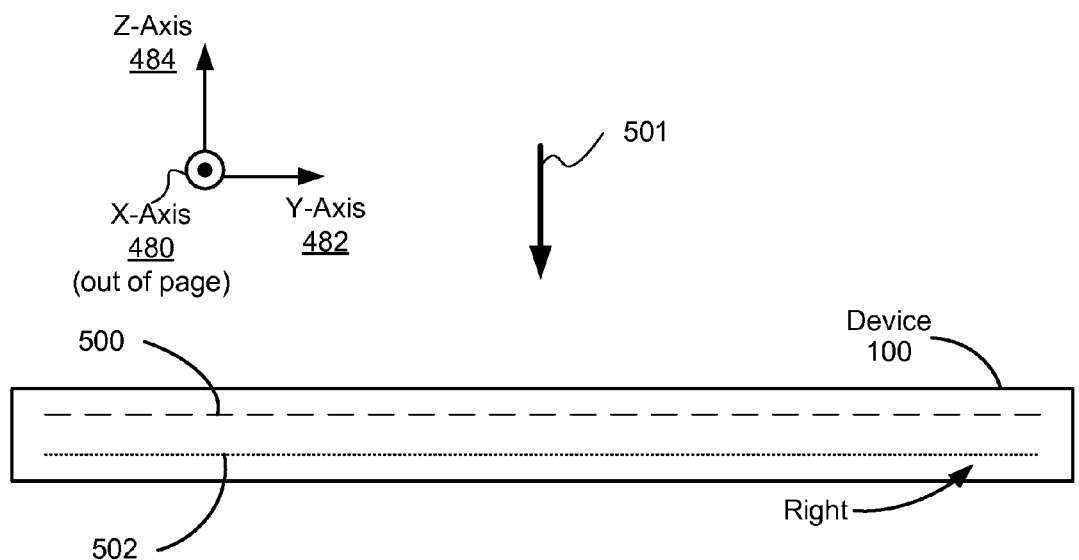
Figure 5C:
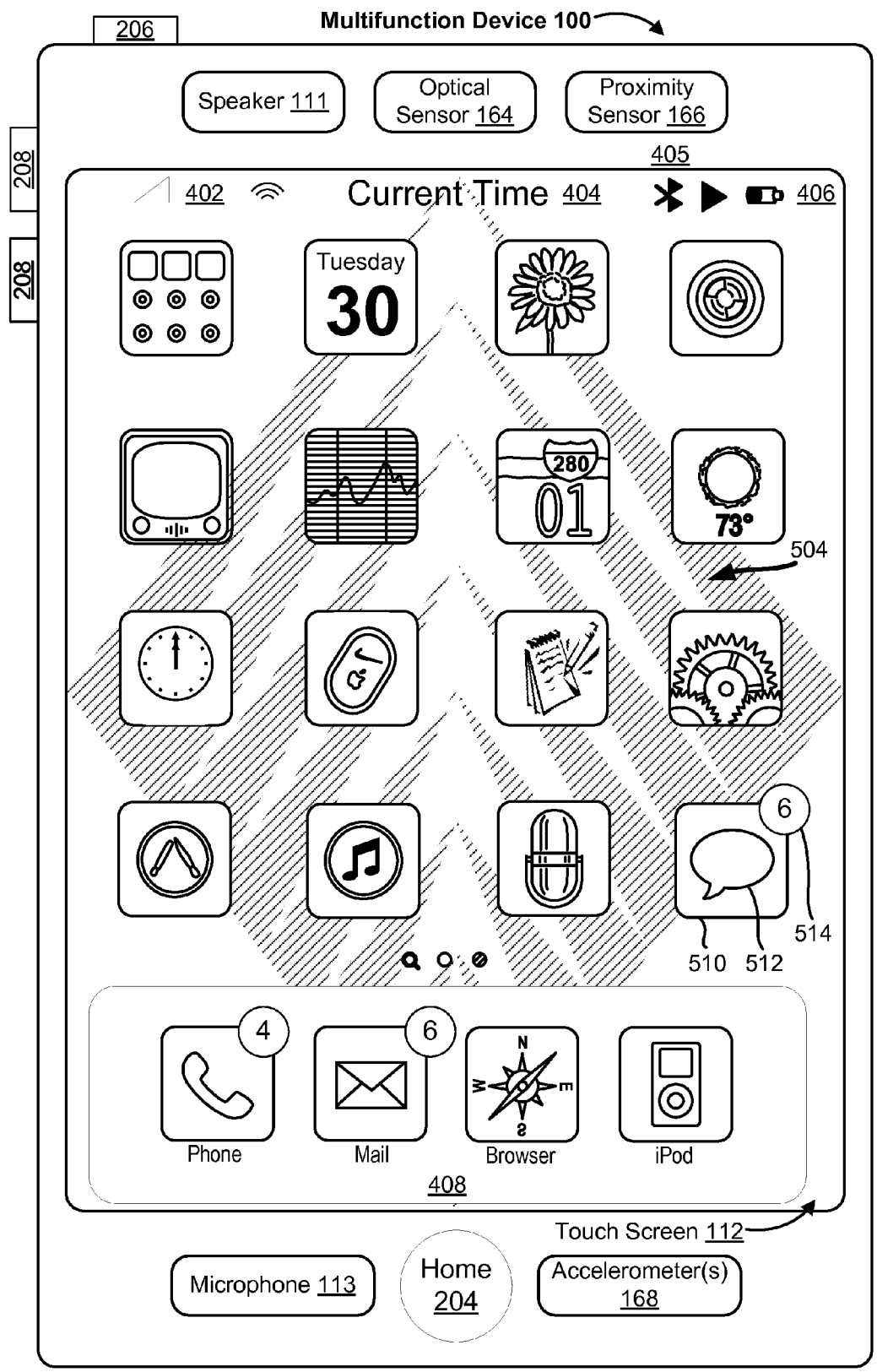
FIGS. 5C, 5E, 5G, 5I, and 5K illustrate exemplary user interfaces associated with various device orientations in accordance with some embodiments.

FIG. 5B is a view of the device 100 from the right side (as depicted in FIG. 4C), according to some embodiments. In FIGS. 5A and 5B, the first layer 500 and the second layer 502 are displayed in an initial position, corresponding to a condition in which the device 100 detects no difference (or an insubstantial difference) between a reference orientation and the detected orientation. While the device 100 is depicted in a substantially horizontal position in FIGS. 5A and 5B, the reference orientation need not correspond to a horizontal orientation, but instead may be any orientation, such as an orientation of the device 100 when the display is turned on, when the display is changed from portrait mode to landscape mode, etc.

FIG. 5C illustrates an exemplary user interface of the device 100 when the device is oriented as shown in FIGS. 5A and 5B. In this example, the wallpaper 504 is or is included in the second layer 502, and the application icons (e.g., the icons described above with respect to FIG. 4A) are or are included in the first layer 500. As shown, the wallpaper (i.e., the second layer 502) and the icons (i.e., the first layer 500) are substantially centered with respect to the device 100 and each other.

Figure 5D:
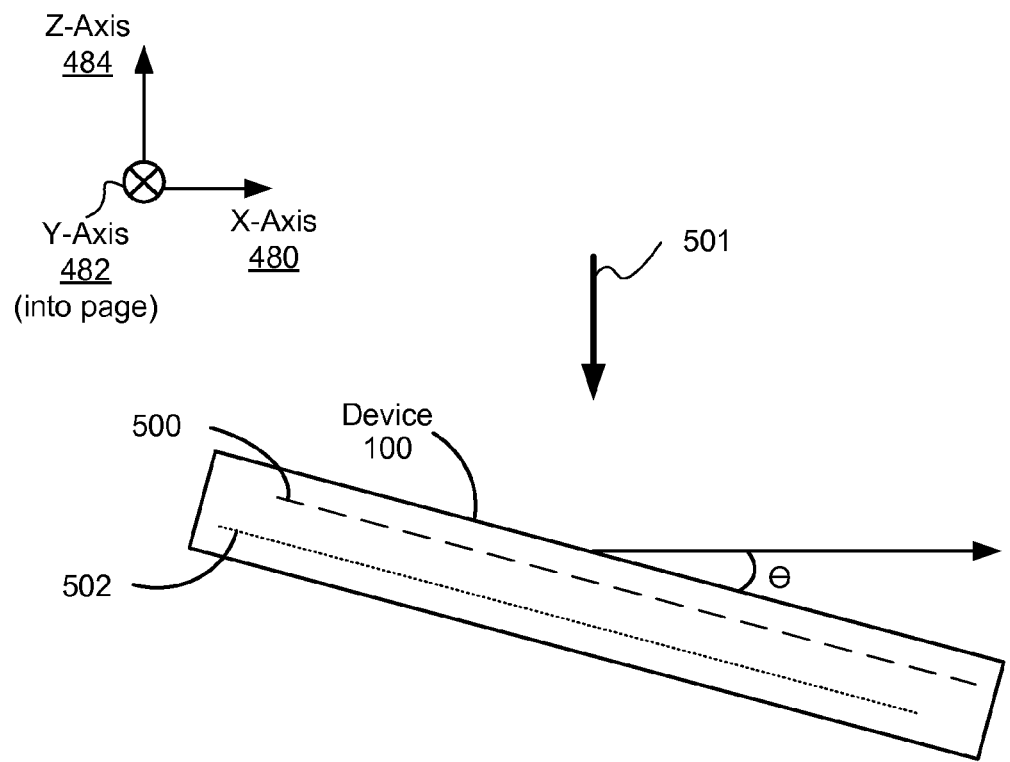
Figure 5E:
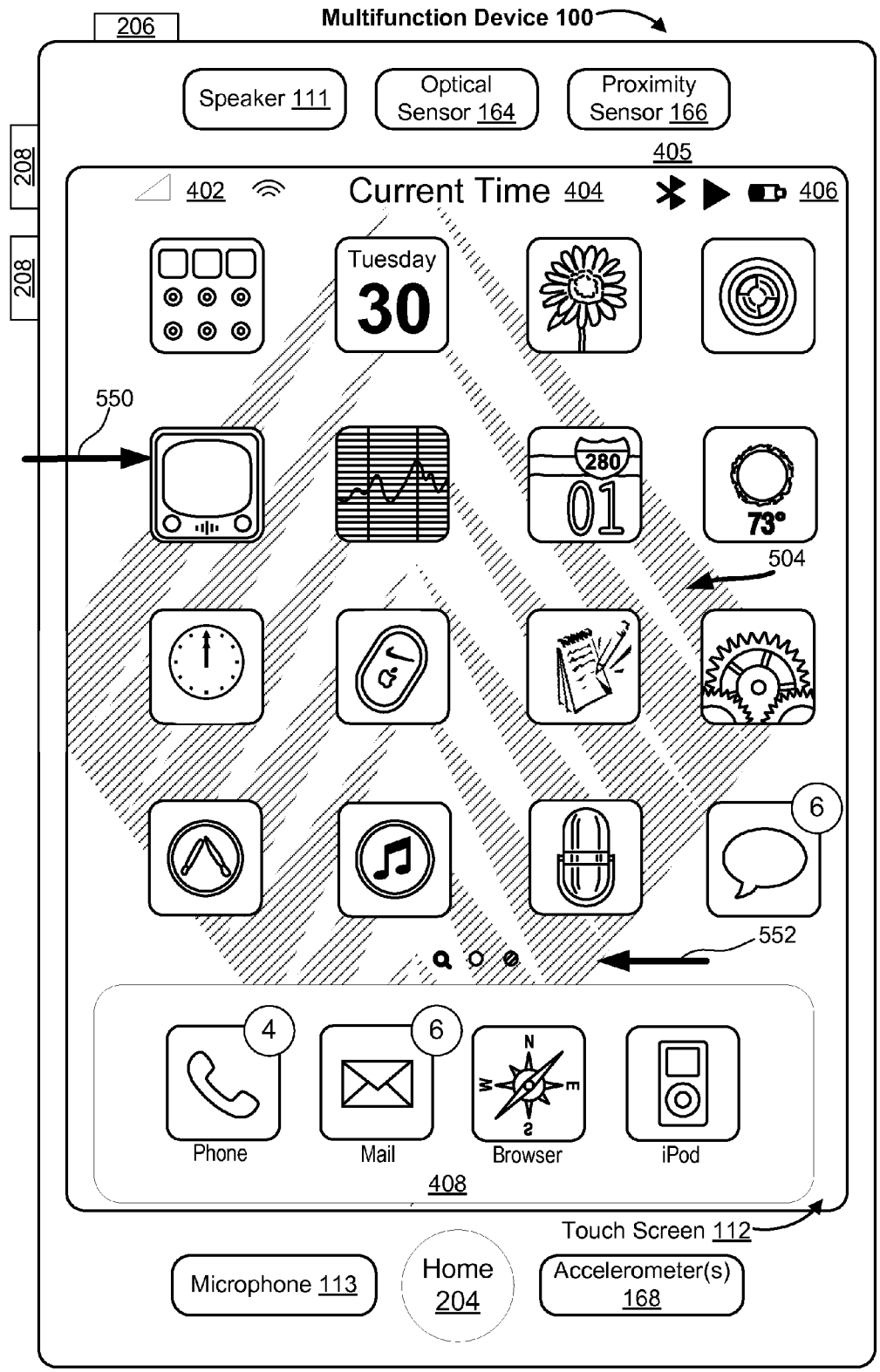

FIG. 5D is a view of the device 100 from the bottom side (as depicted in FIG. 4C), where the device has been rolled about the y axis by an amount θ. This rotation may occur, for example, when a user of the device twists the device in his or her hand such that the right side of the device 100 is further away from the user than the left side. As shown in FIG. 5D, the first layer 500 and the second layer 502 have been offset relative to one another (and/or relative to the device 100). In some embodiments, the offset of the first layer 500 is determined in accordance with the first maximum x offset and the roll angle metric, and the offset of the second layer 502 is determined in accordance with the second maximum x offset and the roll angle metric, as described above.

FIG. 5E illustrates an exemplary user interface of the device 100 when the device is oriented as shown in FIG. 5D. In FIG. 5E, the wallpaper 504 of the second layer 502 has been shifted (relative to its display position in the user interface shown in FIG. 5C) to the left (arrow 552), and the icons in the first layer 500 have been shifted (relative to its display position in the user interface shown in FIG. 5C) to the right (arrow 550).

Figure 5F:
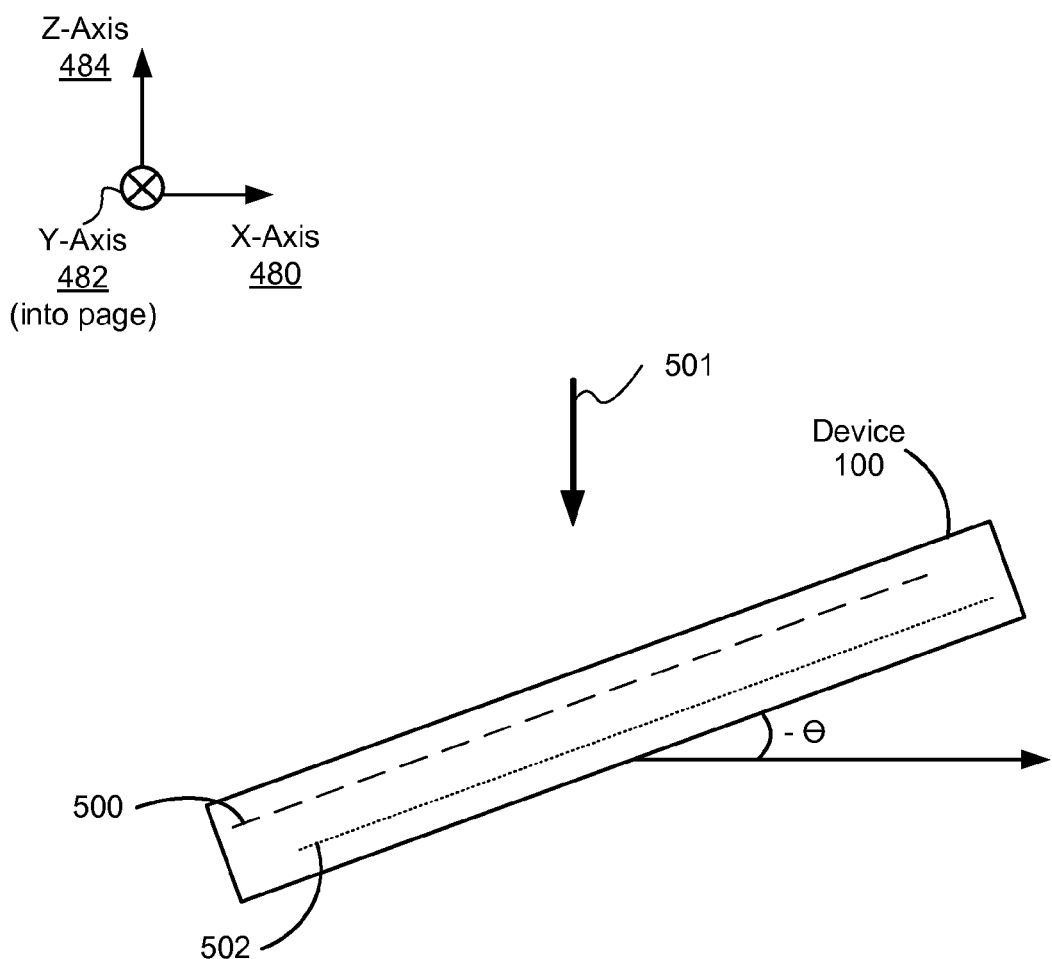

FIG. 5F is a view of the device 100 from the bottom side (as depicted in FIG. 4C), where the device has been rolled about the y axis by an amount −θ. This rotation may occur, for example, when a user of the device twists the device in his or her hand such that the left side of the device 100 is further away from the user than the right side. As shown in FIG. 5F, the first layer 500 and the second layer 502 have been offset relative to one another (and/or relative to the device 100). In some embodiments, the offset of the first layer 500 is determined in accordance with the first maximum x offset and the roll angle metric, and the offset of the second layer 502 is determined in accordance with the second maximum x offset and the roll angle metric, as described above.

Figure 5G:
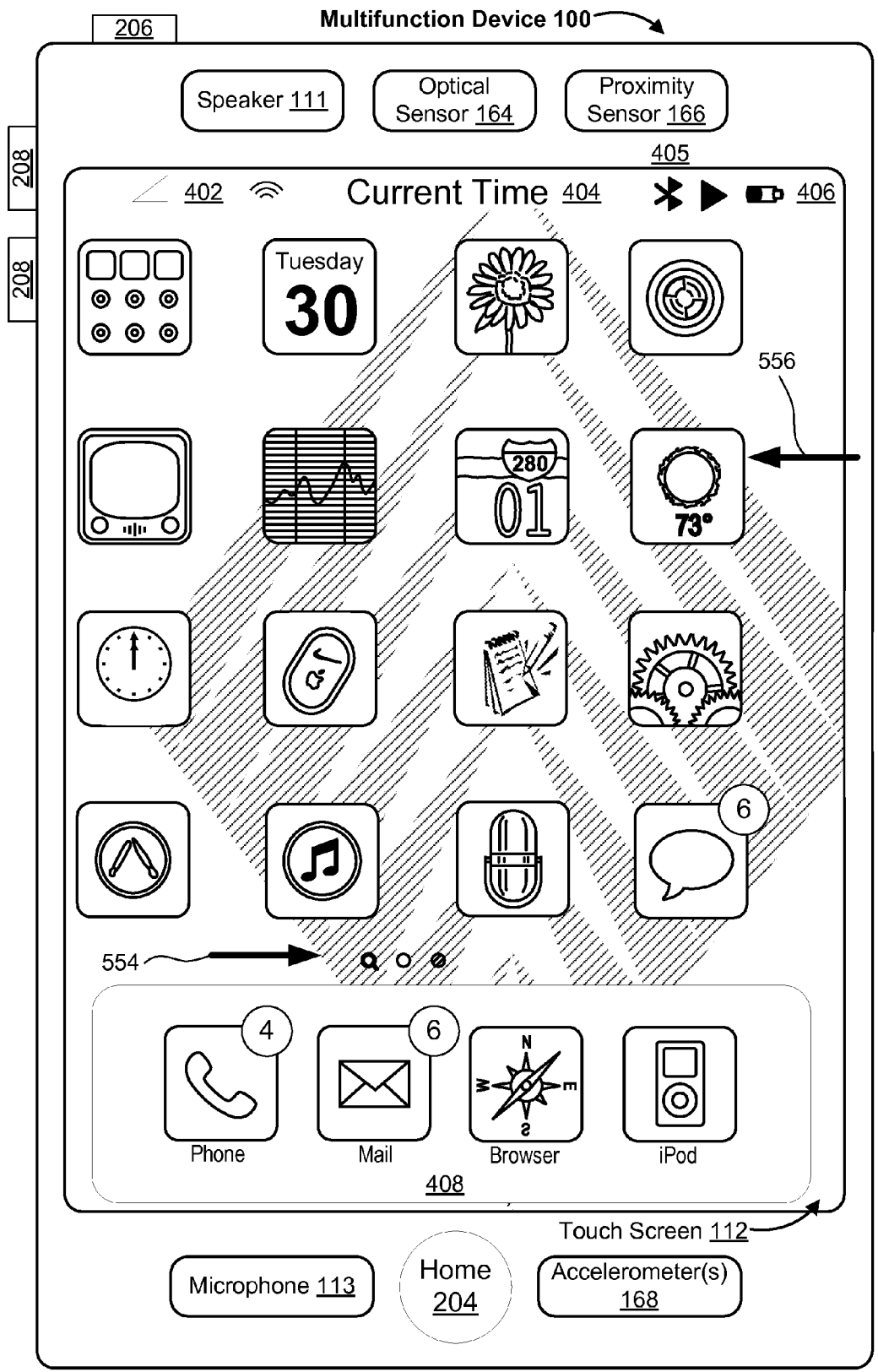

FIG. 5G illustrates an exemplary user interface of the device 100 when the device is oriented as shown in FIG. 5F. In FIG. 5G, the wallpaper 504 of the second layer 502 has been shifted (relative to its display position in the user interface shown in FIG. 5C) to the right (arrow 554), and the icons in the first layer 500 have been shifted (relative to its display position in the user interface shown in FIG. 5C) to the left (arrow 556).

Figure 5H:
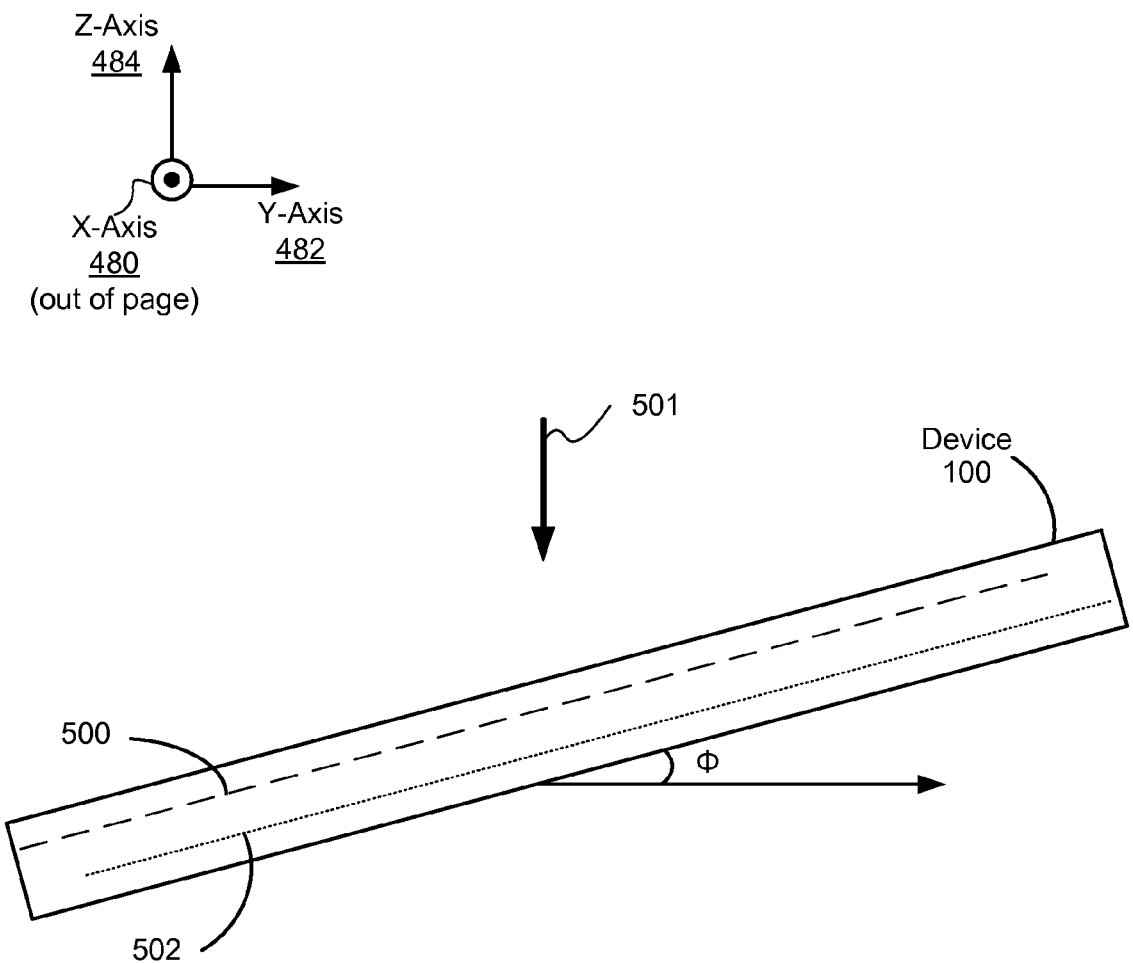

FIG. 5H is a view of the device 100 from the right side (as depicted in FIG. 4C), where the device has been pitched about the x axis by an amount Φ. This rotation may occur, for example, when a user of the device pitches the device in his or her hand such that the bottom side of the device 100 is further away from the user than the top side. As shown in FIG. 5H, the first layer 500 and the second layer 502 have been offset relative to one another (and/or relative to the device 100). In some embodiments, the offset of the first layer 500 is determined in accordance with the first maximum y offset and the pitch angle metric, and the offset of the second layer 502 is determined in accordance with the second maximum y offset and the pitch angle metric, as described above.

Figure 5I:
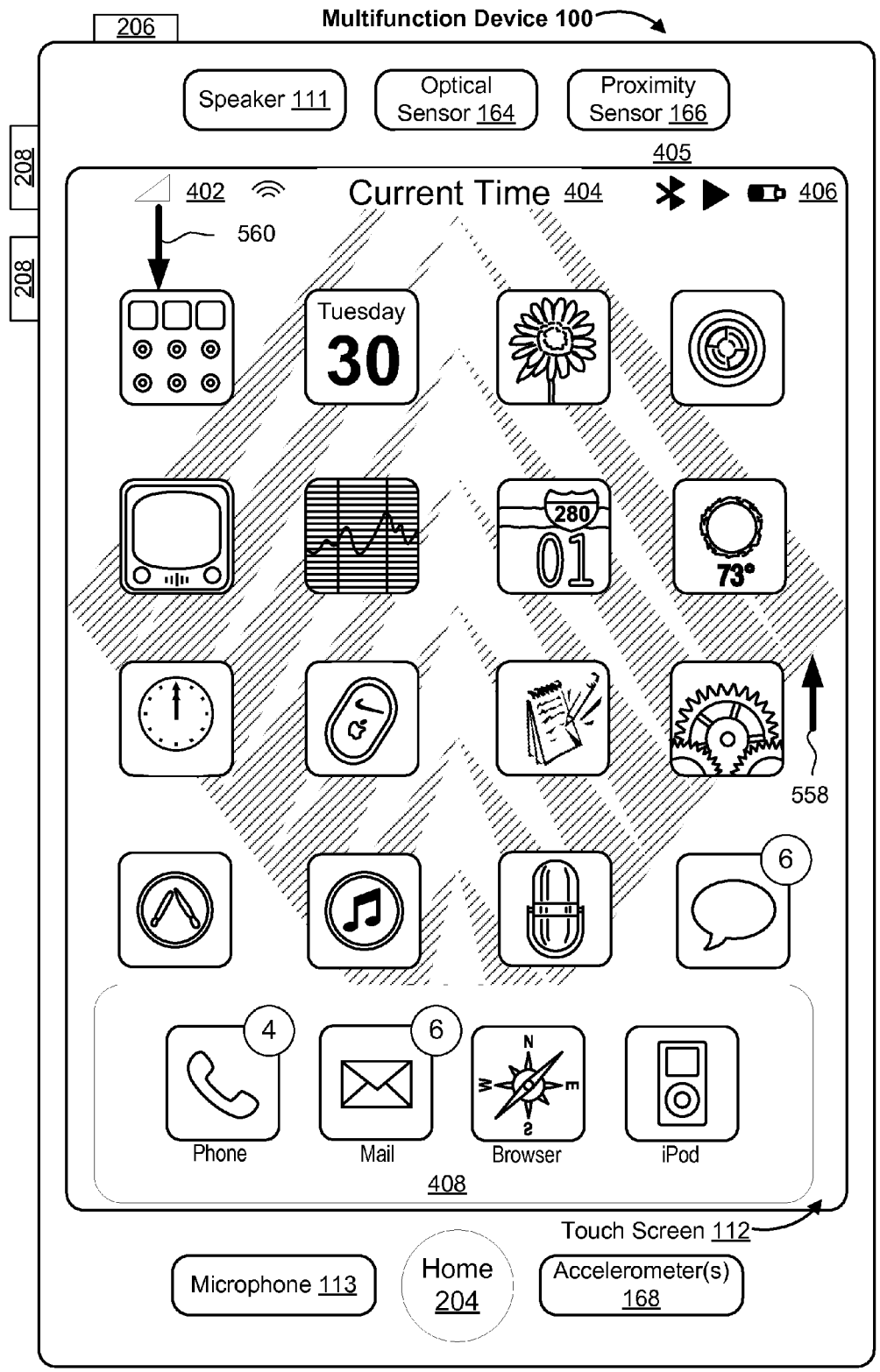

FIG. 5I illustrates an exemplary user interface of the device 100 when the device is oriented as shown in FIG. 5H. In FIG. 5I, the wallpaper 504 of the second layer 502 has been shifted (relative to its display position in the user interface shown in FIG. 5C) up (arrow 558), and the icons in the first layer 500 have been shifted (relative to its display position in the user interface shown in FIG. 5C) down (arrow 560).

Figure 5J:
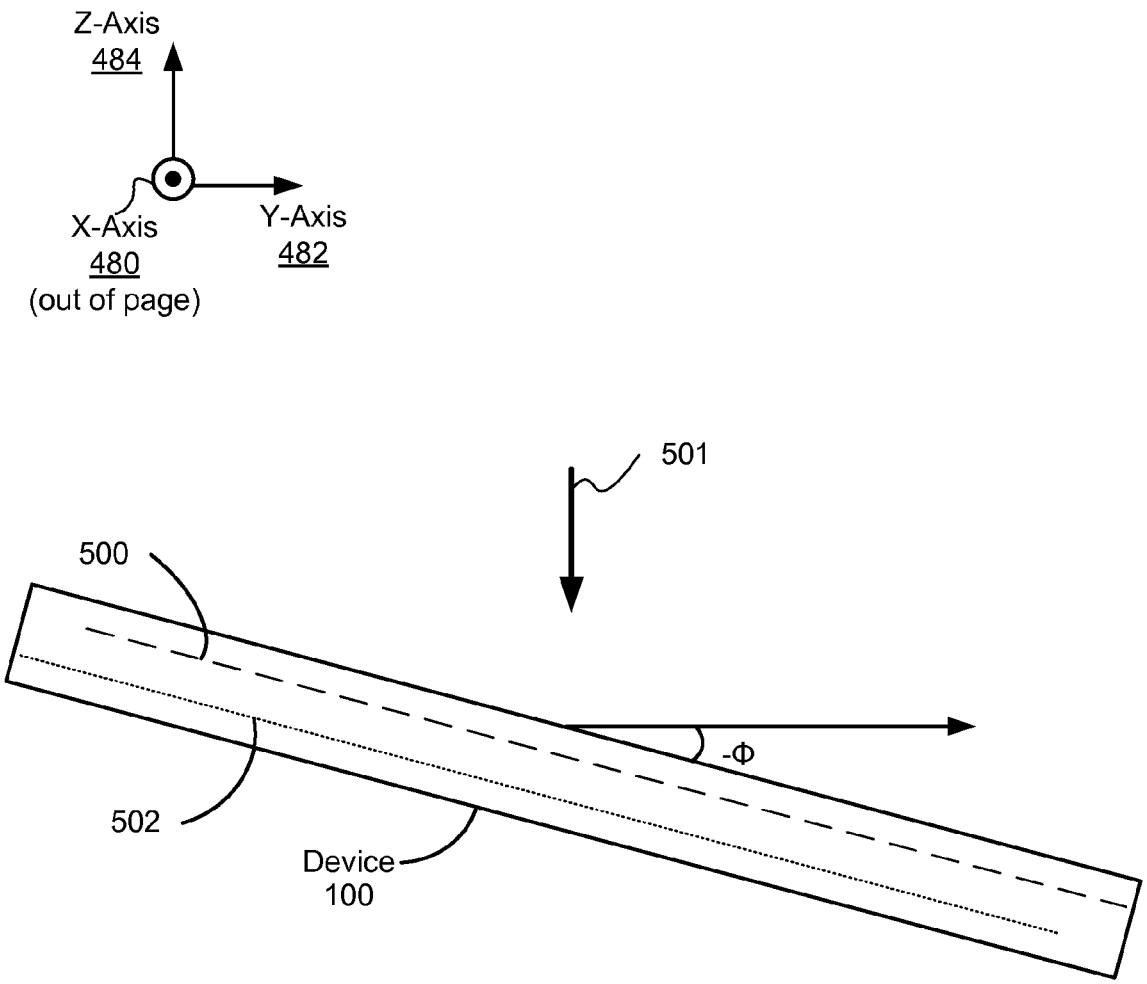

FIG. 5J is a view of the device 100 from the right side (as depicted in FIG. 4C), where the device has been pitched about the x axis by an amount −Φ. This rotation may occur, for example, when a user of the device pitches the device in his or her hand such that the top side of the device 100 is further away from the user than the bottom side. As shown in FIG. 5J, the first layer 500 and the second layer 502 have been offset relative to one another (and/or relative to the device 100). In some embodiments, the offset of the first layer 500 is determined in accordance with the first maximum y offset and the pitch angle metric, and the offset of the second layer 502 is determined in accordance with the second maximum y offset and the pitch angle metric, as described above.

Figure 5K:
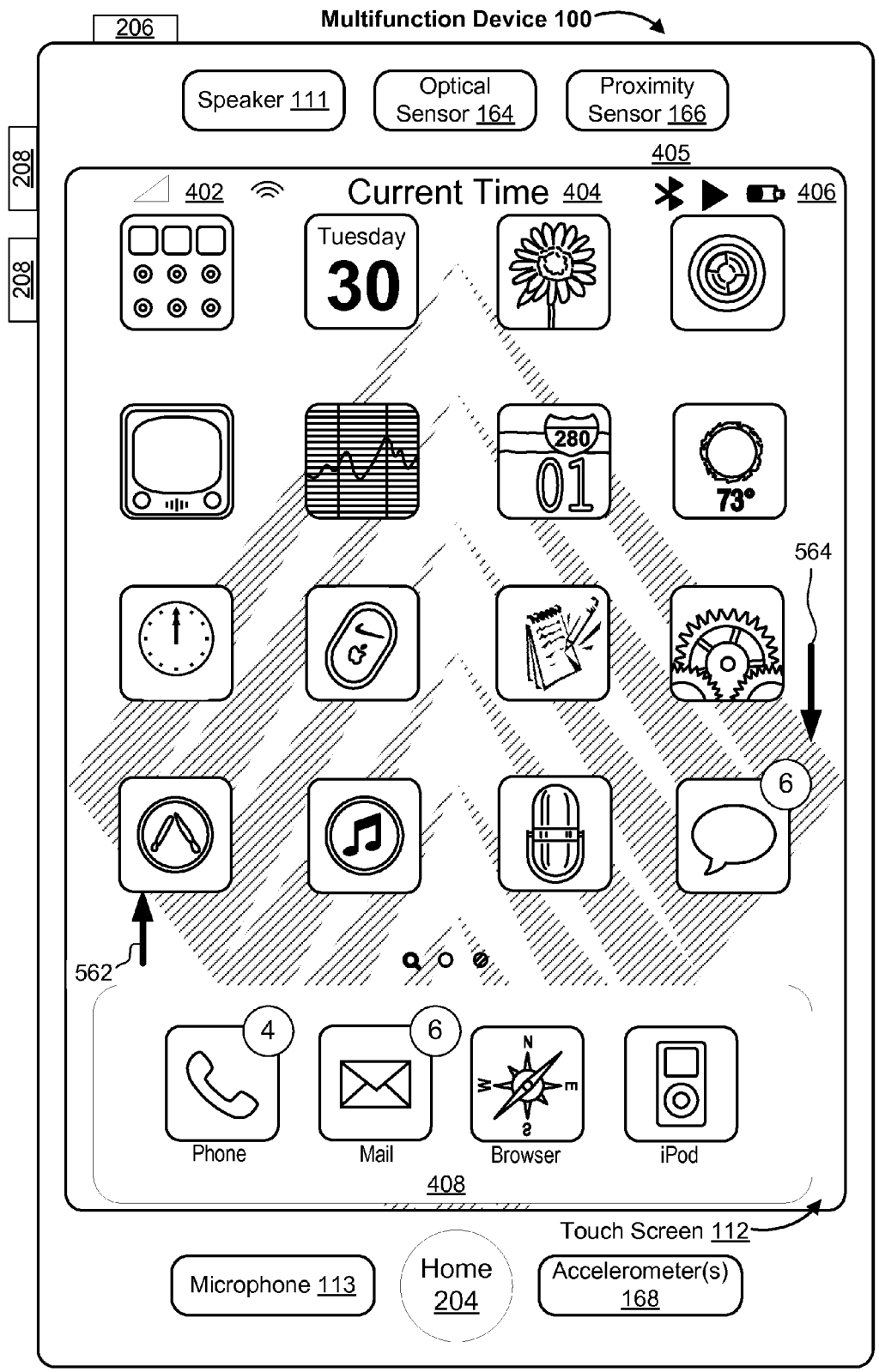

FIG. 5K illustrates an exemplary user interface of the device 100 when the device is oriented as shown in FIG. 5J. In FIG. 5K, the wallpaper 504 of the second layer 502 has been shifted (relative to its display position in the user interface shown in FIG. 5C) down (arrow 564), and the icons in the first layer 500 have been shifted (relative to its display position in the user interface shown in FIG. 5C) up (arrow 562).

In the above examples, the first layer 500 and the second layer 502 are shown shifted along a single axis only. However, it will be apparent to one of skill in the art that layer shifts in the x and y directions can be combined so that the layers shift relative to one another along any path in the x-y plane. Moreover, as described above, one or more layers may be subject to a transformation (e.g., a perspective transformation). Accordingly, the relative positions and shapes of the layers may be manipulated in multiple ways at substantially the same time in order to provide interesting and intuitive visual effects.

The operations described above with reference to FIGS. 5A-5H and 5I-5K are, optionally, implemented by components depicted in FIGS. 1A-1B. The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer-readable storage medium storing one or more programs comprising instructions, which, when executed by an electronic device with a display and an orientation sensor, cause the device to: display three or more display layers, the three or more display layers including at least a first display layer and a second display layer; assign a first maximum x offset and a first maximum y offset to the first display layer; determine a calculated difference between a detected orientation of the electronic device and a reference orientation, wherein the calculated difference includes a roll angle metric and a pitch angle metric; determine a first x offset for the entire first display layer based on the first maximum x offset and the roll angle metric; determine a first y offset for the entire first display layer based on the first maximum y offset and the pitch angle metric; determine a second x offset for the entire second display layer based on the calculated difference; determine a second y offset for the entire second display layer based on the calculated difference; shift display positions of at least the entire first display layer and the entire second display layer, including: applying the first x offset and the first y offset to a display position of the first display layer, and applying the second x offset and the second y offset to a display position of the second display layer; and update display of the three or more display layers after the shifting of the display positions; wherein at least one of the first display layer and the second display layer is responsive to touch input gestures.

2. The medium of claim 1, wherein the instructions further cause the device to:
    assign a second maximum x offset and a second maximum y offset to the second display layer;
    determine the second x offset based on the second maximum x offset and the roll angle metric, and
    determine the second y offset based on the second maximum y offset and the pitch angle metric.

3. The medium of claim 1, wherein the instructions further cause the device to:
    shift display position of a first object relative to the first display layer, including:
        applying a third (x,y) offset to the display position of the first object, relative to the display position of the first display layer;
        wherein the third (x,y) offset is determined in accordance with the calculated difference between the detected orientation of the electronic device and the reference orientation.

4. The medium of claim 3, wherein the instructions further cause the device to:
    shift display position of an object component relative to the first object, including:
        applying a fourth (x,y) offset to the display position of the object component, relative to the display position of the first object;
        wherein the fourth (x,y) offset is determined in accordance with the calculated difference between the detected orientation of the electronic device and the reference orientation.

5. The medium of claim 2, wherein the instructions further cause the device to:
    detect direction locked movement of the device, by detecting when movement of the electronic device meets predefined direction lock criteria, corresponding to changes in pitch angle with less than a threshold level of change in roll angle;
    in accordance with detection of direction locked movement of the device, maintain current values of the first x offset and the second x offset during the direction locked movement of the device.

6. The medium of claim 5, wherein the instructions further cause the device to: in accordance with detection of direction locked movement of the device, during the direction locked movement of the device, determine a value of the first y offset in accordance with a third maximum y offset distinct from the first maximum y offset, and determine a value of the second y offset in accordance with a fourth maximum y offset distinct from the second maximum y offset.

7. The medium of claim 1, wherein the instructions further cause the device to:
    apply a transformation to the first layer that simulates tilting or 3 dimensional rotation of the first layer;
    wherein updating display of the three or more display layers after the shifting of the display positions includes updating display of the three or more display layers after the shifting of the display positions and the application of the transformation to the first layer.

8. The medium of claim 1, wherein the instructions further cause the device to:
    establish the reference orientation of the device before the shifting of the display positions; and
    in accordance with detection of any of a set of predefined events, determine an updated reference orientation:
        determine an updated calculated difference between an updated detected orientation of the electronic device and the updated reference orientation, wherein the calculated difference includes an updated roll angle metric and an updated pitch angle metric;
        determine an updated first x offset for the first display layer based on the first maximum x offset and the updated roll angle metric;
        determine an updated first y offset for the first display layer based on the first maximum y offset and the updated pitch angle metric;

determine an updated second x offset for the second display layer based on the updated calculated difference; and determine an updated second y offset for the second display based on the updated calculated difference.

9. The medium of claim 8, wherein the set of predefined events include two or more of the set consisting of: a movement of the device that exceeds a predefined speed criterion, a change in displayed content that meets predefined criteria, and a change from displaying content to or from a landscape orientation from or to a portrait orientation.

10. The medium of claim 1, wherein the instructions further cause the device to: display at least four layers, including a wallpaper layer, a dock layer, an application layer containing icons or application content, and a status information layer.

11. A method, comprising: at an electronic device with a display and an orientation sensor: displaying three or more display layers, the three or more display layers including at least a first display layer and a second display layer; assigning a first maximum x offset and a first maximum y offset to the first display layer; determining a calculated difference between a detected orientation of the electronic device and a reference orientation, wherein the calculated difference includes a roll angle metric and a pitch angle metric; determining a first x offset for the entire first display layer based on the first maximum x offset and the roll angle metric; determining a first y offset for the entire first display layer based on the first maximum y offset and the pitch angle metric; determining a second x offset for the entire second display layer based on the calculated difference; determining a second y offset for the entire second display layer based on the calculated difference; shifting display positions of at least the entire first display layer and the entire second display layer, including: applying the first x offset and the first y offset to a display position of the first display layer, and applying the second x offset and the second y offset to a display position of the second display layer; and updating display of the three or more display layers after the shifting of the display positions; wherein at least one of the first display layer and the second display layer is responsive to touch input gestures.

12. An electronic device, comprising: a display; an orientation sensor; a touch-sensitive surface; one or more processors; memory; and one or more programs, wherein the one or more programs are stored in the memory and configured to be executed by the one or more processors, the one or more programs including instructions for: displaying, on the display, three or more display layers, the three or more display layers including at least a first display layer and a second display layer; assigning a first maximum x offset and a first maximum y offset to the first display layer; determining a calculated difference between a detected orientation of the electronic device and a reference orientation, wherein the calculated difference includes a roll angle metric and a pitch angle metric; determining a first x offset for the entire first display layer based on the first maximum x offset and the roll angle metric; determining a first y offset for the entire first display layer based on the first maximum y offset and the pitch angle metric; determining a second x offset for the entire second display layer based on the calculated difference; determining a second y offset for the entire second display layer based on the calculated difference; shifting display positions of at least the entire first display layer and the entire second display layer, including: applying the first x offset and the first y offset to a display position of the first display layer, and applying the second x offset and the second y offset to a display position of the second display layer; and updating display of the three or more display layers after the shifting of the display positions; wherein at least one of the first display layer and the second display layer is responsive to touch input gestures.

13. The device of claim 12, wherein the one or more programs further include instructions for:
assigning a second maximum x offset and a second maximum y offset to the second display layer;
determine the second x offset based on the second maximum x offset and the roll angle metric, and
determine the second y offset based on the second maximum y offset and the pitch angle metric.

14. The device of claim 12, wherein the one or more programs further include instructions for:
shifting display position of a first object relative to the first display layer, including:
applying a third (x,y) offset to the display position of the first object, relative to the display position of the first display layer;
wherein the third (x,y) offset is determined in accordance with the calculated difference between the detected orientation of the electronic device and the reference orientation.

15. The device of claim 14, wherein the one or more programs further include instructions for:
shifting display position of an object component relative to the first object, including:
applying a fourth (x,y) offset to the display position of the object component, relative to the display position of the first object;
wherein the fourth (x,y) offset is determined in accordance with the calculated difference between the detected orientation of the electronic device and the reference orientation.

16. The device of claim 13, wherein the one or more programs further include instructions for:
detecting direction locked movement of the device, by detecting when movement of the electronic device meets predefined direction lock criteria, corresponding to changes in pitch angle with less than a threshold level of change in roll angle;
in accordance with detection of direction locked movement of the device, maintaining current values of the first x offset and the second x offset during the direction locked movement of the device.

17. The device of claim 16, wherein the one or more programs further include instructions for: in accordance with detection of direction locked movement of the device, during the direction locked movement of the device, determining a value of the first y offset in accordance with a third maximum y offset distinct from the first maximum y offset, and determining a value of the second y offset in accordance with a fourth maximum y offset distinct from the second maximum y offset.

18. The device of claim 12, wherein the one or more programs further include instructions for:
applying a transformation to the first layer that simulates tilting or 3 dimensional rotation of the first layer;
wherein updating display of the three or more display layers after the shifting of the display positions includes updating display of the three or more display layers after the shifting of the display positions and the application of the transformation to the first layer.

19. The device of claim 12, wherein the one or more programs further include instructions for:

establishing the reference orientation of the device before the shifting of the display positions; and in accordance with detection of any of a set of predefined events, determine an updated reference orientation:

determining an updated calculated difference between an updated detected orientation of the electronic device and the updated reference orientation, wherein the calculated difference includes an updated roll angle metric and an updated pitch angle metric;

determining an updated first x offset for the first display layer based on the first maximum x offset and the updated roll angle metric;

determining an updated first y offset for the first display layer based on the first maximum y offset and the updated pitch angle metric;

determining an updated second x offset for the second display layer based on the updated calculated difference; and determining an updated second y offset for the second display based on the updated calculated difference.

20. The device of claim 19, wherein the set of predefined events include two or more of the set consisting of: a movement of the device that exceeds a predefined speed criterion, a change in displayed content that meets predefined criteria, and a change from displaying content to or from a landscape orientation from or to a portrait orientation.

21. The device of claim 12, wherein the one or more programs further include instructions for: displaying at least four layers, including a wallpaper layer, a dock layer, an application layer containing icons or application content, and a status information layer.

22. The medium of claim 1, wherein the first display layer and the second display layer are either coplanar or on parallel planes.

23. The method of claim 11, wherein the first display layer and the second display layer are either coplanar or on parallel planes.

24. The device of claim 12, wherein the first display layer and the second display layer are either coplanar or on parallel planes.

* * * * *